(12) United States Patent
Gong et al.

(10) Patent No.: US 12,475,258 B2
(45) Date of Patent: Nov. 18, 2025

(54) METHOD, ELECTRONIC DEVICE, AND COMPUTER PROGRAM PRODUCT FOR DATA ANONYMIZATION

(71) Applicant: Dell Products L.P., Round Rock, TX (US)

(72) Inventors: Min Gong, Shanghai (CN); Zijia Wang, WeiFang (CN); Zhisong Liu, Shenzhen (CN)

(73) Assignee: DELL PRODUCTS L.P., Round Rock, TX (US)

( * ) Notice: Subject to any disclaimer, the term of this patent is extended or adjusted under 35 U.S.C. 154(b) by 214 days.

(21) Appl. No.: 18/141,185

(22) Filed: Apr. 28, 2023

(65) Prior Publication Data

US 2024/0311509 A1    Sep. 19, 2024

(30) Foreign Application Priority Data

Mar. 17, 2023   (CN) .......................... 202310263850.X

(51) Int. Cl.
  *G06F 21/62*          (2013.01)
(52) U.S. Cl.
  CPC ...... *G06F 21/6254* (2013.01); *G06F 21/6227* (2013.01)
(58) Field of Classification Search
  CPC .................... G06F 21/6254; G06F 21/6227
  See application file for complete search history.

(56) References Cited

U.S. PATENT DOCUMENTS

| | | | |
|---|---|---|---|
| 2018/0082082 A1* | 3/2018 | Lowenberg | G06F 21/602 |
| 2019/0026490 A1* | 1/2019 | Ahmed | G06F 21/6254 |
| 2019/0156060 A1* | 5/2019 | Maier | G06N 20/00 |
| 2019/0258824 A1* | 8/2019 | Gkoulalas-Divanis | G06F 21/6254 |

(Continued)

OTHER PUBLICATIONS

Yoon, Jinsung; Drumright, Lydia N.; van der Schaar, Mihaela; "Anonymization Through Data Synthesis Using Generative Adversarial Networks (ADS-GAN)," IEEE Journal of Biomedical and Health Informatics, vol. 24, No. 8, Aug. 2020, pp. 2378-2388.*

(Continued)

*Primary Examiner* — Victor Lesniewski
(74) *Attorney, Agent, or Firm* — Chamberlain, Hrdlicka, White, Williams & Aughtry; Aly Z. Dossa

(57) ABSTRACT

Embodiments disclosed herein relate to a method, an electronic device, and a computer program product for data anonymization. The method includes: performing classification on data by a classifier to obtain data types of the data. The method further includes: performing anonymization on the data by a first anonymization model to obtain first anonymized data. The method further includes: determining, based on the data types, using an anonymizer whether re-anonymization needs to be performed on the first anonymized data. The method further includes: performing, based on a determination that the re-anonymization needs to be performed, the re-anonymization on the first anonymized data by a second anonymization model to obtain second anonymized data. Accordingly, anonymization processing may be performed on data using different anonymization models for different types of data to obtain the final anonymized data and to ensure that no data leakage occurs.

20 Claims, 6 Drawing Sheets

(56) References Cited

U.S. PATENT DOCUMENTS

| | | | |
|---|---|---|---|
| 2019/0347344 A1* | 11/2019 | Kessler | G06F 11/3055 |
| 2020/0065521 A1* | 2/2020 | Durvasula | H04L 63/0421 |
| 2020/0311296 A1* | 10/2020 | Kim | G06F 21/6227 |
| 2022/0180226 A1* | 6/2022 | McCarthy | G06N 5/04 |
| 2023/0259650 A1* | 8/2023 | Sepehri | G06F 16/906 726/1 |
| 2024/0020415 A1* | 1/2024 | Zhang | G06F 21/6254 |
| 2024/0078253 A1* | 3/2024 | Hawco | G06N 7/01 |
| 2024/0095400 A1* | 3/2024 | Poe | G06F 11/0766 |

OTHER PUBLICATIONS

Temuujin, Odsuren; Ahn, Jinhyun; Im, Dong-Hyuk; "Efficient L-Diversity Algorithm for Preserving Privacy of Dynamically Published Datasets," IEEE Access, vol. 7, Aug. 2019, pp. 122878-122888.*

Rajendran et al., "A study on k-anonymity, l-diversity, and t-closeness Techniques focusing Medical Data." IJCSNS International Journal of Computer Science and Network Security, vol. 17 No. 12, Dec. 2017 (7 pages).

Xu et al., "Synthesizing Tabular Data Using Generative Adversarial Networks." arXiv preprint. arXiv:1811.11264v1. Nov. 27, 2018. <https://arxiv.org/pdf/1811.11264>, etrieved on Feb. 9, 2024 (12 pages).

Hulsebos, M., et al., "Sherlock: A Deep Learning Approach to Semantic Data Type Detection." KDD'19 2019. 9 pages. Jul. 25, 2019. <https://vis.csail.mit.edu/pubs/sherlock.pdf>, retrieved on Feb. 9, 2024.

Park et al., "Data Synthesis based on Generative Adversarial Networks." Proceedings of the VLDB Endowment, arXiv:1806. 03384v5, Jul. 2, 2018. <https://arxiv.org/pdf/1806.03384>, etrieved on Feb. 9, 2024 (16 pages).

Wang, Ke et al., "SentiGAN: Generating Sentimental Texts via Mixture Adversarial Networks." Proceedings of the Twenty-Seventh International Join Conference on Artificial Intelligence (IJCAI-18). website <https://www.ijcai.org/Proceedings/2018/0618. pdf>, 7 pages. Apr. 28, 2019, retrieved from Internet Archive Wayback Machine <https://web.archive.org/web/20190428080929/https://www.ijcai.org/Proceedings/2018/0618.pdf>, on Feb. 9, 2024.

Xu, Lei, et al. "Modeling Tabular Data using Conditional GAN." 33rd Conference on Neural Information Processing Systems (NeurIPS 2019). <https://arxiv.org/abs/1907.00503>, arXiv:1907.00503v2. Oct. 28, 2019, retrieved on Feb. 9, 2024 (15 pages).

Yu, Lantao, et al. "SeqGAN: Sequence Generative Adversarial Nets with Policy Gradient." Proceedings of the AAAI conference on artificial intelligence. vol. 31. No. 1. arXiv:1609.05473v6. Aug. 25, 2017. <https://arxiv.org/abs/1609.05473>, retrieved on Feb. 9, 2024 (11 pages).

"Copulas". webpage <https://github.com/sdv-dev/Copulas>, 3 pages. Feb. 24, 2021, retrieved from Internet Archive Wayback Machine <https://web.archive.org/web/20210705200320/https://github.com/sdv-dev/Copulas> on Feb. 9, 2024.

"CTGAN" webpage <https://github.com/sdv-dev/CTGAN>, 4 pages. Jan. 27, 2020, retrieved from Internet Archive Wayback Machine <https://web.archive.org/web/20200627100536/https://github.com/sdv-dev/CTGAN>, retrieved on Feb. 9, 2024.

"Differences Between PII, Sensitive PII, and PHI." Civicengage, CivicPlus. webpage <https://www.civicengagecentral.civicplus.help/hc/en-us/articles/1500001543581-Differences-Between-PII-Sensitive-PII-and-PHI>. 2 pages, Sep. 27, 2022, retrieved from Internet Archive Wayback Machine <https://web.archive.org/web/20220927180239/https://www.civicengagecentral.civicplus.help/hc/en-us/articles/1500001543581-Differences-Between-PII-Sensitive-PII-and-PHI> on Feb. 9, 2024.

"Iris flower data set." Wikipedia, The Free Encyclopedia. Nov. 20, 2022. <https://en.wikipedia.org/w/index.php?title=Iris_flower_data_set&oldid=1122848065>, retrieved on Feb. 9, 2024 (4 pages).

"Mockaroo". Fake Data. webpage <https://www.mockaroo.com/>, 1 page. Nov. 1, 2020, retrieved from Internet Archive Wayback Machine <https://web.archive.org/web/20201101012530/https://mockaroo.com/> on Feb. 9, 2024.

"Provides". Faker. <website https://faker.readthedocs.io/en/master/providers.html>, 1 page. Jul. 20, 2026, retrieved from Internet Archive Wayback Machine <https://web.archive.org/web/20160720224001/https://faker.readthedocs.io/en/master/providers.html>, retrieved on Feb. 9, 2024.

"Summary of the HIPAA Privacy Rule." U.S. Department of Health and Human Services. 35 pages. Oct. 19, 2022. <https://www.hhs.gov/hipaa/for-professionals/privacy/laws-regulations/index.html>, retrieved on Jul. 27, 2023.

"Synthetic Data Vault (SDV)". webpage <https://github.com/sdv-dev/SDV>, 4 pages. Sep. 7, 2020, retrieved from Internet Archive Wayback Machine <https://web.archive.org/web/20200916175833/https://github.com/sdv-dev/SDV> on Feb. 9, 2024.

The Simpsons Characters Data: Kaggle. <https://www.kaggle.com/datasets/alexattia/the-simpsons-characters-dataset?select=number_pic_char.csv>. 1 page, available in 2021, as a publication, retrieved on Feb. 8, 2024.

* cited by examiner

500

| Data column | Anonymization model |
|---|---|
| Address | faker. provider. address |
| Credit card | faker. provider. credit _ card |
| Email | Regular expression |
| User review | Textual GAN model |
| . . . | . . . |

FIG. 5

METHOD, ELECTRONIC DEVICE, AND COMPUTER PROGRAM PRODUCT FOR DATA ANONYMIZATION

CROSS REFERENCE TO RELATED APPLICATIONS

This application claims priority under 35 U.S.C. § 119 to Chinese Patent Application No. 202310263850.X, filed on Mar. 17, 2023. The contents of Chinese Patent Application No. 202310263850.X are incorporated by reference in its entirety.

TECHNICAL FIELD

Embodiments of the present disclosure relate to the field of computers, and more particularly, to a method, an electronic device, and a computer program product for data anonymization.

BACKGROUND

In today's data analysis framework, tabular data is a widely used data type that is used in many use cases, such as business analysts, data science work, and almost all software applications. Even in the workflow of machine learning and deep learning based on unstructured data training models, some datasets also use tabular data to hold sample attributes and labels.

In many cases, tabular data needs to be accessed, shared, or distributed across companies, teams, and individual roles. Examples include, but are not limited to, various situations such as: companies may make data available to employees for business development purposes, but need to prevent leakage of critical information because the data may relate to their friends or celebrities; companies may make data available to outside consultants, but need to eliminate the risk in the event of an accidental breach; data may be provided by a data owner to software engineers to test new tools or features; and a data owner may provide data to internal colleagues as an educational tutorial.

At the same time, the data owner wants to protect private information in the data. Among all mainstream solutions, synthesizing new data by processing original data with anonymization models is a common technique, as it may avoid data leakage in most scenarios by generating completely new data.

SUMMARY OF THE INVENTION

Embodiments of the present disclosure provide a method, an electronic device, and a computer program product for data anonymization.

In one aspect of the present disclosure, a method for data anonymization is provided. The method includes: performing classification on data by a classifier to obtain data types of the data; performing anonymization on the data by a first anonymization model to obtain first anonymized data; determining, based on the data types, using an anonymizer whether re-anonymization needs to be performed on the first anonymized data; and performing, based on a determination that the re-anonymization needs to be performed, the re-anonymization on the first anonymized data by a second anonymization model to obtain second anonymized data.

In another aspect of the present disclosure, an electronic device is provided. The device includes a processing unit and a memory, wherein the memory is coupled to the processing unit and stores instructions. The instructions, when executed by the processing unit, perform the following actions: performing classification on data by a classifier to obtain data types of the data; performing anonymization on the data by a first anonymization model to obtain first anonymized data; determining, based on the data types, using an anonymizer whether re-anonymization needs to be performed on the first anonymized data; and performing, based on a determination that the re-anonymization needs to be performed, the re-anonymization on the first anonymized data by a second anonymization model to obtain second anonymized data.

In still another aspect of the present disclosure, a computer program product is provided. The computer program product is tangibly stored on a non-transient computer-readable medium and includes computer-executable instructions, the computer-executable instruction, when executed, causing a computer to perform the method or process according to the embodiments of the present disclosure.

The Summary of the Invention is provided to introduce relevant concepts in a simplified manner, which will be further described in the Detailed Description below. The Summary of the Invention part is neither intended to identify key features or essential features of the present disclosure, nor intended to limit the scope of the embodiments of the present disclosure.

BRIEF DESCRIPTION OF THE DRAWINGS

The above and other features, advantages, and aspects of embodiments of the present disclosure will become more apparent in conjunction with the accompanying drawings and with reference to the following detailed description. Throughout the drawings, the same or similar reference numerals represent the same or similar elements.

FIG. 5 illustrates a flowchart of an anonymizer according to embodiments of the present disclosure.

DETAILED DESCRIPTION

Figure 1:
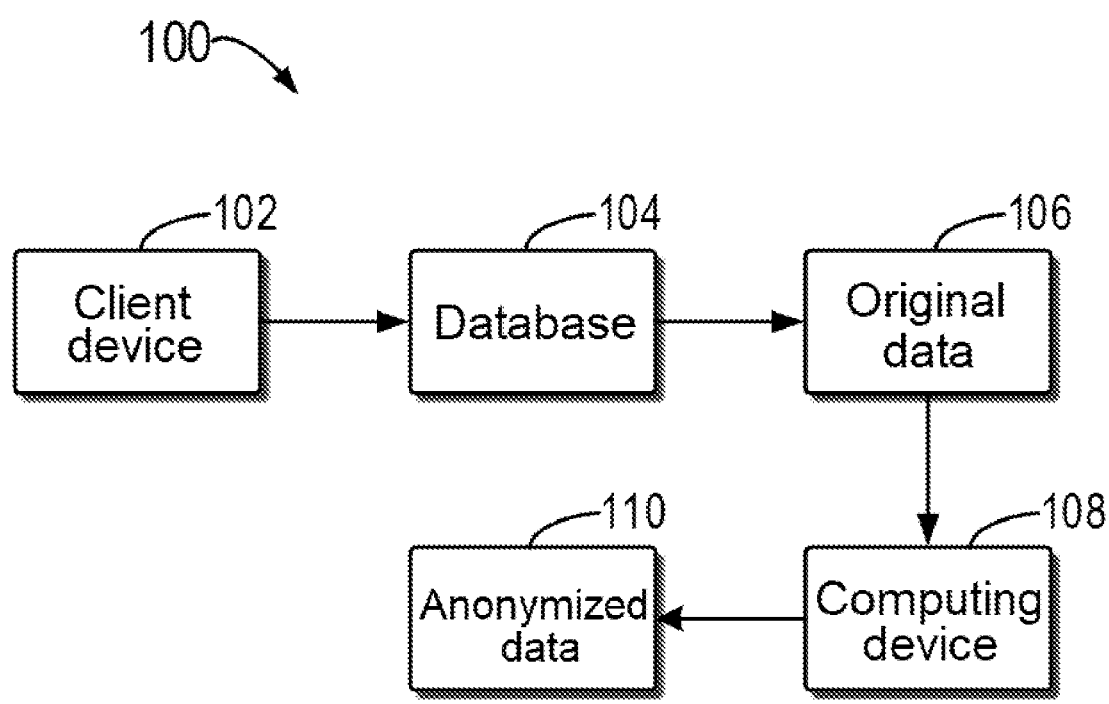
FIG. 1 illustrates a schematic diagram of an example environment in which embodiments of the present disclosure may be implemented.

Embodiments of the present disclosure will be described in more detail below with reference to the accompanying drawings. While some specific embodiments of the present disclosure are shown in the accompanying drawings, it should be understood that the present disclosure may be implemented in various forms, and should not be limited to the embodiments set forth herein. Rather, these embodiments are provided to make the present disclosure more thorough and complete and to fully convey the scope of the present disclosure to those skilled in the art.

The term "include" and variants thereof used in this text indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects, unless otherwise specifically indicated.

In addition, all specific numerical values herein are examples, which are provided only to aid in understanding, and are not intended to limit the scope.

In many cases, data may need to be accessed, shared, or distributed among companies, teams, and individual roles, but to avoid data leakage, the data may require anonymization. There are existing data anonymization techniques, such as generating new data by falsifying data, generating new data based on statistics, or generating new data using generative adversarial network models. However, each type of model has some potential problems, especially when dealing with tabular data, which has multiple types of data columns. The existing data anonymization techniques may only work well on certain types of data, and may not effectively handle some types of data columns, thus leading to data leakage.

To address the above and other potential problems, embodiments of the present disclosure provide a method for data anonymization. The method may include: when processing data, first performing classification on the data and processing the data using a first anonymization model, and performing re-anonymization on the data using a second anonymization model when it is determined that the data needs to be re-anonymized. As a result, even if there is a risk of data leakage after processing using the first anonymization model when there are multiple types of data, the second anonymization model may be used to effectively process the data and avoid data leakage.

The basic principles and some embodiments of the present disclosure are illustrated below with reference to FIG. 1 to FIG. 6. It should be understood that these embodiments are given only to enable those skilled in the art to better understand and thus implement the embodiments of the present disclosure, and are not intended to limit the scope of the present disclosure in any way.

FIG. 1 illustrates a schematic diagram of an example environment 100 in which embodiments of the present disclosure may be implemented. Referring to FIG. 1, the example environment 100 may include a client device 102, a database 104, original data 106, a computing device 108, and anonymized data 110. It should be understood that the numbers, the arrangement, and the processing process of devices illustrated in FIG. 1 are only examples, and that the example system may include different numbers of devices and processing processes that are arranged in different manners, various additional elements, etc.

In one or more embodiments, the client device 102 may include, but not limited to: a personal computer, such as a desktop computer or a laptop computer, which may run various operating systems that provide many tools for developing software and implementing various functions; a smartphone, which is typically equipped with various sensors and interfaces, such as cameras, microphones, GPS, etc., and may run various operating systems; a tablet, which is typically larger than a cell phone and has a higher screen resolution and higher processing power, and may also run a variety of operating systems; and a smart watch and other wearable devices, which are typically paired with smartphones and may provide functions such as interaction with smartphones, notification alerts, etc. In some embodiments of the present disclosure, a querying party that queries the database 104 may request the database 104 via the client device 102.

In one or more embodiments, the database 104 may include, but is not limited to: a relational database, which is the most common type of database, that uses the structured query language (SQL) to manage data, and uses tables to store data; a non-relational database, which does not use the SQL language to manage data, but rather uses different data models, such as key-value, document, column family, etc.; a graphical database, which is a special type of database that uses graphical models to store data and is usually used to manage data with complex relationships, such as social networks or knowledge graphs; and a distributed database, which is a type of database that stores data in a plurality of physical locations to improve scalability and fault tolerance, and is typically used for large-scale applications and systems. In some embodiments of the present disclosure, the database 104 may store a variety of data that the querying party may query.

The querying party may request the database 104 via the client device 102 to obtain the original data 106. For example, the original data 106 may be tabular data obtained from the database 104 that matches the query criteria. Tabular data may refer to a commonly used type of structured data, which is usually presented in the form of a table where each row represents a record and each column represents a field. Tabular data may often be used to store and manage large amounts of structured data, such as a company's sales data, customer data, inventory data, and so on. Tabular data may usually include a number of rows and columns, where each row represents a data record, and each column represents a data type or attribute. The data value in each data record must match the data type of the column in which it is located. For example, a table containing customer information might include the following fields: customer name, customer ID, address, phone number, and so on. The data value in each record must match the data type of the field in which it is located, for example, the customer ID must be a unique identifier, the phone number must be a number, and the like. In some embodiments of the present disclosure, the original data 106 may be obtained from the database 104, but the original data 106 often may not be presented directly to the querying party because certain fields in the original data 106, such as customer name, customer ID, address, phone number, and so on, involve personal privacy, and the data may be processed by anonymization techniques, otherwise there is a risk of data leakage.

In one or more embodiments, the computing device 108 may include, but is not limited to: a server, which is a high-performance computing device typically used to store and process large amounts of data and applications, and typically has a high-speed processor, high-capacity storage, high-speed network connectivity, and other characteristics, and may host the needs of a plurality of users or applications; and a cloud computing device, which is typically highly scalable and flexible and may be dynamically configured and managed according to the needs of applications. In embodiments of the present disclosure, the computing device 108 may be a server and/or a meta-computing device for anonymization processing on the original data 106.

Through processing by the computing device 108, the anonymized data 110 may be obtained. For example, for tabular data, each data column in the original data 106 is subjected to anonymization processing to obtain the anonymized data 110. Each data column in the anonymized data 110 corresponds to each data column in the original data 106, but has been anonymized so that there is no risk of data leakage. For example, for data such as customer names, customer IDs, addresses, and phone numbers, they must be subjected to anonymization processing before being displayed to users. However, there may be different types of data, including but not limited to the following types: numeric types, such as data on height, weight, monthly salary, and the like; unique types, where the data is different for each entry, such as customer number and customer ID; enumerated types, which represent data with a finite number of possible values, such as gender and occupation; text types, such as customer reviews; and date types, such as date of birth. Since there may be different types of data columns in tabular data, a corresponding anonymization technique may be used for each type, otherwise data leakage may also be caused. The data types discussed here are used only for illustrative purposes and are intended to describe the technical methods more clearly without imposing restrictions on the data types.

Although the anonymization processing for tabular data is described above in conjunction with FIG. 1, it is understood by those skilled in the art that the anonymization method according to embodiments of the present disclosure is not limited to processing tabular data, but may also be applied as needed in any scenario where anonymization processing needs to be performed on other types of data, and the present disclosure does not limit the application scenario.

Figure 2:
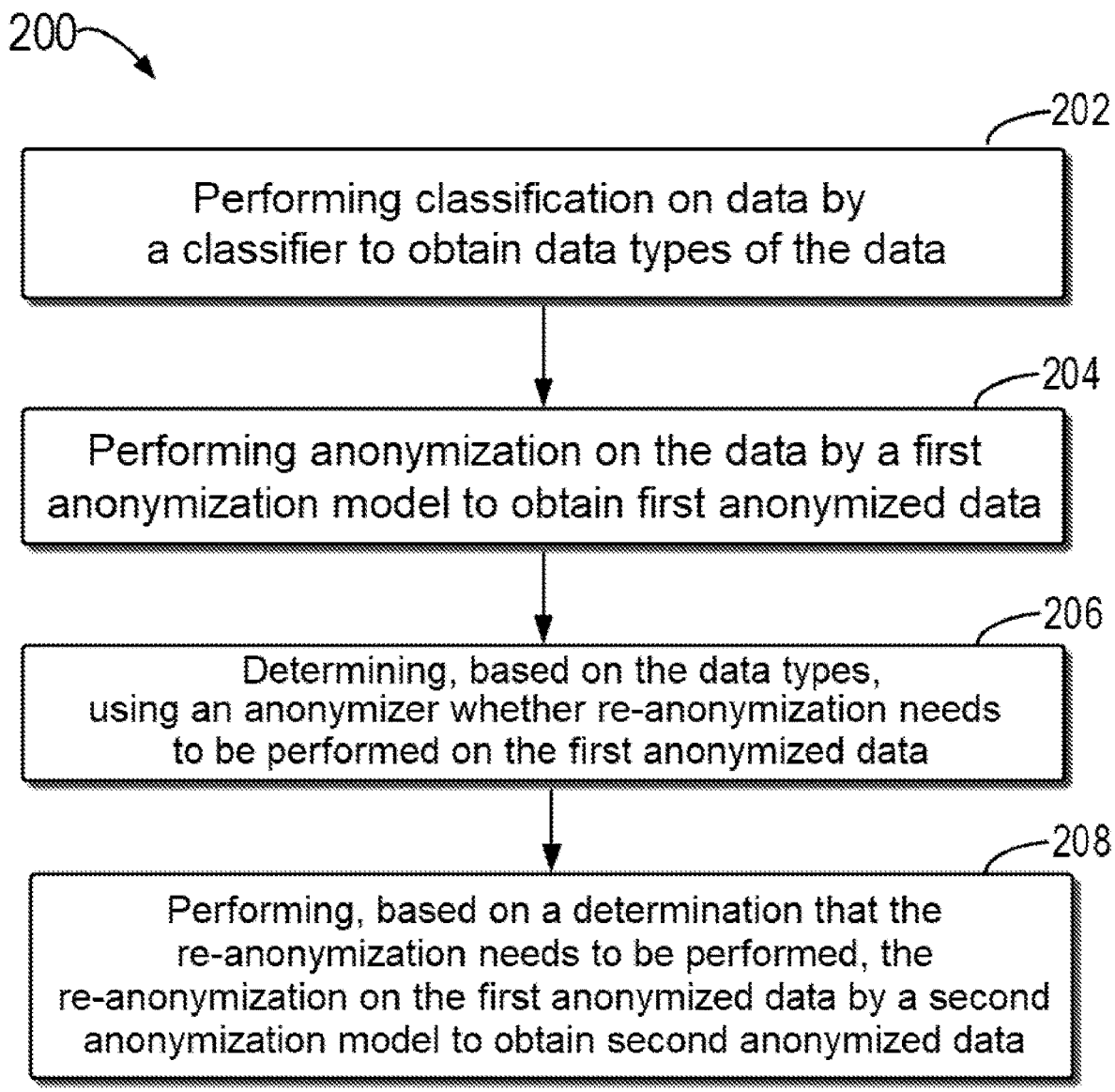
FIG. 2 illustrates a flowchart for data anonymization according to embodiments of the present disclosure.

FIG. 2 illustrates a flowchart 200 for data anonymization according to embodiments of the present disclosure. At block 202, classification on data is performed by a classifier to obtain data types of the data. For example, through classifying the data by the classifier, data types may be acquired, and the data types are very important for data anonymization because different data types are suitable to be processed by different anonymization techniques. In some embodiments, the obtained data types may be numeric types, unique types, enumerated types, free text types, and date types, as described above. Anonymization processing techniques may include tabular generative adversarial network (GAN) models, pseudo-data generation models, statistical models, and textual GAN models, among others. A tabular GAN model may refer to a generative adversarial network model for generating tabular data, which may be a variant of GAN that includes a generator and a discriminator, the two models competing with each other to generate fake data that looks similar to real data. Similarly, a textual GAN model may be a generative adversarial network model for generating textual data, but introduces a recurrent neural network (RNN) for processing textual data. Each anonymization processing technique is suitable for processing certain types of data, for example, the tabular GAN model is suitable for processing numeric and enumerative types, because the tabular GAN may learn the implicit patterns of numeric and enumerative types, and thus the generated anonymization model has similar patterns, for example, the mean, variance, and so on of the anonymized data are the same as those of the original data, which is important in some usage scenarios. Through the processing at block 202, the data types of the data are obtained, which will be used later in subsequent steps.

At block 204, anonymization on the data is performed by a first anonymization model to obtain first anonymized data. In some embodiments of the present disclosure, the first anonymization model may be a tabular GAN model. For example, the first anonymized data is obtained by anonymizing each data column in the tabular data with the tabular GAN. As mentioned above, different data types are suitable to be processed using different anonymization techniques. For example, the tabular GAN model is suitable for processing numeric types and enumerated types, but it is not suitable for processing unique types, such as customer phone numbers and so on, because when processing such data, the anonymized data obtained from anonymization processing by the tabular GAN model is obtained by randomly breaking up the original data, and thus although the position of the data has changed, the data is still presented in its original form, and then it still causes data leakage. Therefore, the first anonymized data is obtained through block 204, of which some types of data have been appropriately anonymized, but some types of data need to be re-anonymized to prevent the risk of data leakage.

At block 206, based on the data types, it is determined using an anonymizer whether re-anonymization needs to be performed on the first anonymized data. As mentioned above, some of the data in the first anonymizer need to be re-anonymized, so an appropriate anonymization model is selected based on the data types for processing the data. For example, in the case where the first anonymizer is a tabular GAN model and the data type is a numeric type and/or an enumerative type, it is determined that there is no need to re-anonymize the first anonymized data because the tabular GAN model is suitable for processing data of numeric and enumerative types and will not cause data leakage; whereas in the case where the first anonymizer is a tabular GAN model and the data type is a text type and/or a unique type, it is determined that re-anonymization on the first anonymized data needs to be performed.

At block 208, based on a determination that the re-anonymization needs to be performed, the re-anonymization on the first anonymized data is performed by a second anonymization model to obtain second anonymized data. As described above, re-anonymization needs to be performed in some cases to ensure that the data is anonymized with a suitable anonymization technique and that there is no risk of data leakage. In some embodiments, a textual GAN model may be selected to process data of a text type, such as user review data, and the textual GAN model may generate new user reviews that are different from the original user reviews, while also ensuring that the new user reviews "look like" the user review data. In other words, the querying party, when given the anonymized data, will also think that the new user reviews are actual user review data, but at the same time, data anonymization is also realized to ensure that the data will not be leaked.

Figure 3:
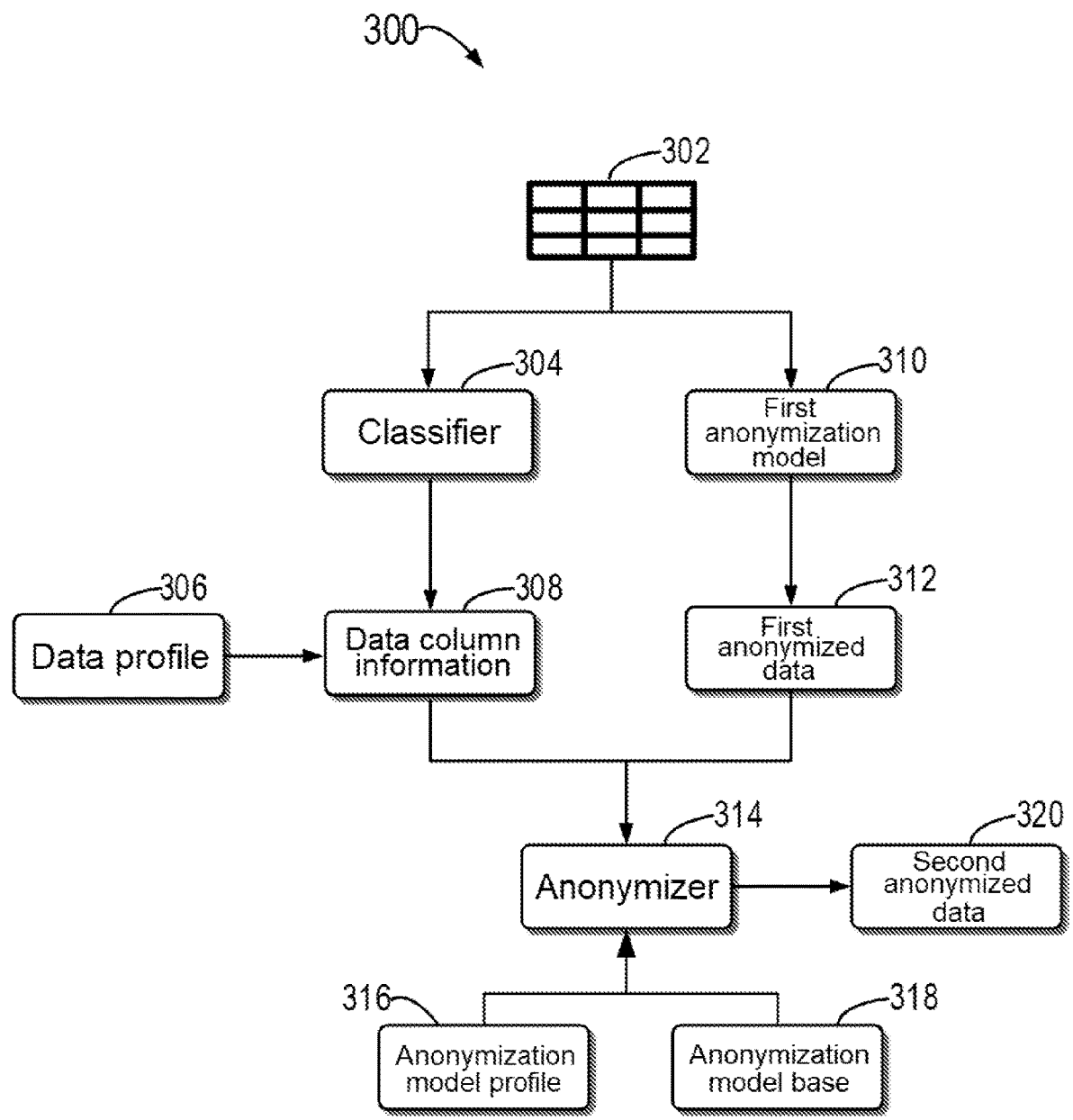
FIG. 3 illustrates a flowchart for processing tabular data according to embodiments of the present disclosure.

FIG. 3 illustrates a flowchart 300 for processing tabular data according to embodiments of the present disclosure. As shown in FIG. 3, tabular data 302 is first input. In some embodiments of the present disclosure, the tabular data 302 has a plurality of data columns, and each data column has a different data type. In addition, each data column corresponds to a different data anonymization level, for example, for the data column of customer ID, its corresponding data anonymization level will be high, while for the data column of the customer gender type, its corresponding data anonymization level will be low, which mainly depends on the degree of privacy of the data.

The data type of each data column is obtained by classifying each data column of the tabular data 302 by the classifier 304. For example, the data type may be a numeric type, a unique type, an enumerated type, a text type, and a date type, among others. After obtaining the data type, in the subsequent operation, the corresponding data anonymity degree and the corresponding anonymization processing technique may be determined to determine whether to re-anonymize the data column.

Based on the data type obtained by the classifier 304, the corresponding data anonymity level is found from the data profile 306 through lookup, wherein the data profile 306 records the data anonymization level for each of the different data types. It should be understood that the data profile 306 is not fixed, and customers may adjust the anonymization level of a certain data type according to their own business needs.

Based on the data type obtained by the classifier 304 and the data anonymization level obtained by the data profile 306, data column information 308 is obtained. An example of the data column information 308 is as shown in Table 1:

TABLE 1

| Column number | Column type | Anonymization level |
|---|---|---|
| $C_1$ | Email | $L_1 = 3$ |
| $C_2$ | Gender | $L_2 = 1$ |
| $C_3$ | Address | $L_3 = 3$ |
| $C_4$ | Review | $L_4 = 2$ |
| ... | ... | ... |
| $C_i$ | $S_i$ | $L_i$ |

The tabular data 302 is input into the first anonymization model 310, and the first anonymized data 312 is output through the first anonymization model 310. In some embodiments, the first anonymization model 310 may be a tabular GAN model, and using the tabular GAN model, anonymization processing is performed for each data column in the tabular data 302 to obtain the first anonymized data 312. However, as mentioned above, there are data columns of some data types that are not suitable for anonymization processing using the tabular GAN model, resulting in these data columns still being at risk of data leakage, and thus requiring subsequent re-anonymization processing.

The data column information 308 and the first anonymized data 312 are input to the anonymizer 314, and according to the data column information 308, the anonymizer determines whether some columns in the first anonymized data 312 need to be re-anonymized. As described above, there are some data columns in the first anonymized data 312 that need re-anonymization processing, and according to the data column information 308, the anonymizer 314 determines which data columns need re-anonymization processing. Meanwhile, for the data columns that need to be subjected to re-anonymization processing, suitable anonymization models are selected from an anonymization model base 318 according to data column information for these data columns as well as an anonymization model profile 316, where the anonymization model profile 316 records data columns that are suitable to be processed by each anonymization model (specifically, the data types suitable to be processed). Thus, the first anonymized data 312 is input to the anonymizer 314, and remains unchanged for data columns that do not need to be re-anonymized; whereas for data columns that need to be re-anonymized, a suitable anonymization model is selected from the anonymization model base 318 to perform re-anonymization processing, thereby obtaining second anonymized data 320.

Figure 4:
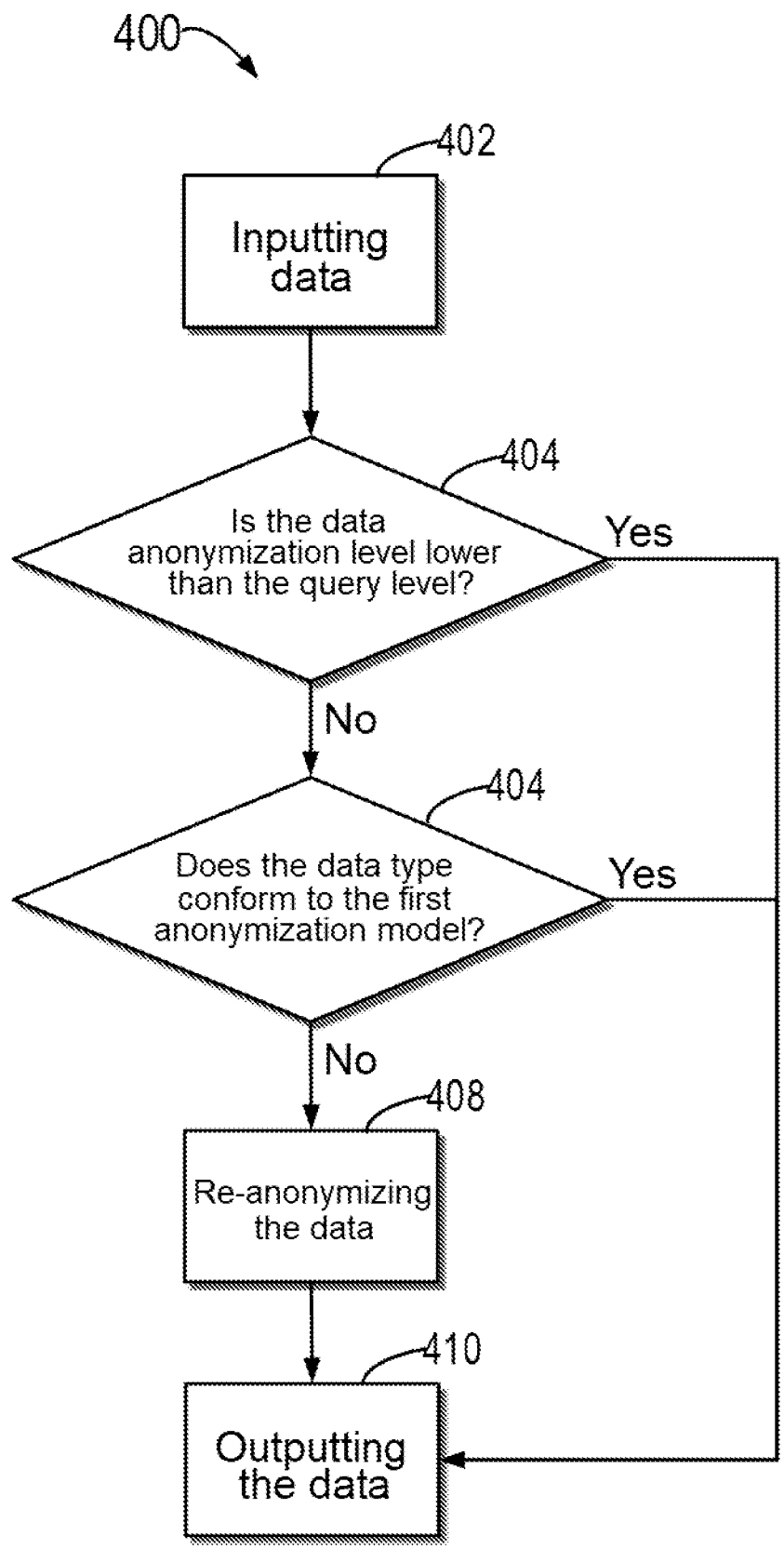
FIG. 4 illustrates a flowchart of an anonymizer according to embodiments of the present disclosure.

FIG. 4 illustrates a flowchart 400 of an anonymizer according to embodiments of the present disclosure. First, data is input at 402, where the first anonymized data and the data column information need to be input here for subsequent use, as described above. At 404, it is judged whether the data anonymization level is lower than a query level, and if the result of the judgment is true, the process ends, that is, no re-anonymization on the first anonymized data needs to be performed. In other words, when the data anonymization level is lower than the query level, the querying party has a high query permission, and there is no risk of data leakage even if the first anonymized data is not processed by a suitable anonymization technique.

However, if the result of the above judgment is false, the process proceeds to 406 to judge whether the data type conforms to the first anonymization model, and if the result of the judgment is true, the process ends, that is, no re-anonymization on the first anonymized data needs to be performed. Similarly, in the case where the data type conforms to the first anonymization model, the first anonymization model is suitable to process this data type, then there is also no risk of data leakage for the obtained first anonymized data.

If it is judged at 406 that the data type does not conform to the first anonymization model, that is, the first anonymization model is not suitable to process that data type, then there exists the risk of data leakage for the obtained first anonymized data, and then the process proceeds to 408 to re-anonymize the data. As described in FIG. 3, when performing the re-anonymization, the anonymization model suitable for this data type is determined from the anonymization model profile 316, and the anonymization model is also invoked from the anonymization model base 318 to re-anonymize the data to ensure that there is no risk of leakage for the final anonymized data obtained. Finally, at 410, the data is output.

FIG. 5 illustrates an example 500 of an anonymization model profile according to embodiments of the present disclosure. As shown in FIG. 5, the data column includes a number of data types, and the example 500 lists different types of data columns such as the address type, the credit card type, the email type, the user review type, among others. In addition to the data columns of these common data types, a variety of other data columns are included, and new types of data columns may be customized according to the needs of users. The anonymization model shows the anonymization models corresponding to the data columns. For example, based on the determination that the data column is a data column of the address type, an anonymization model corresponding to the data column of the address type may be invoked for re-anonymization by invoking the faker.provider.address class in the program code. Similarly, based on the determination that the data column is a user review (as described above, of the text type), a textual GAN model is invoked to re-anonymize the user review.

Figure 6:
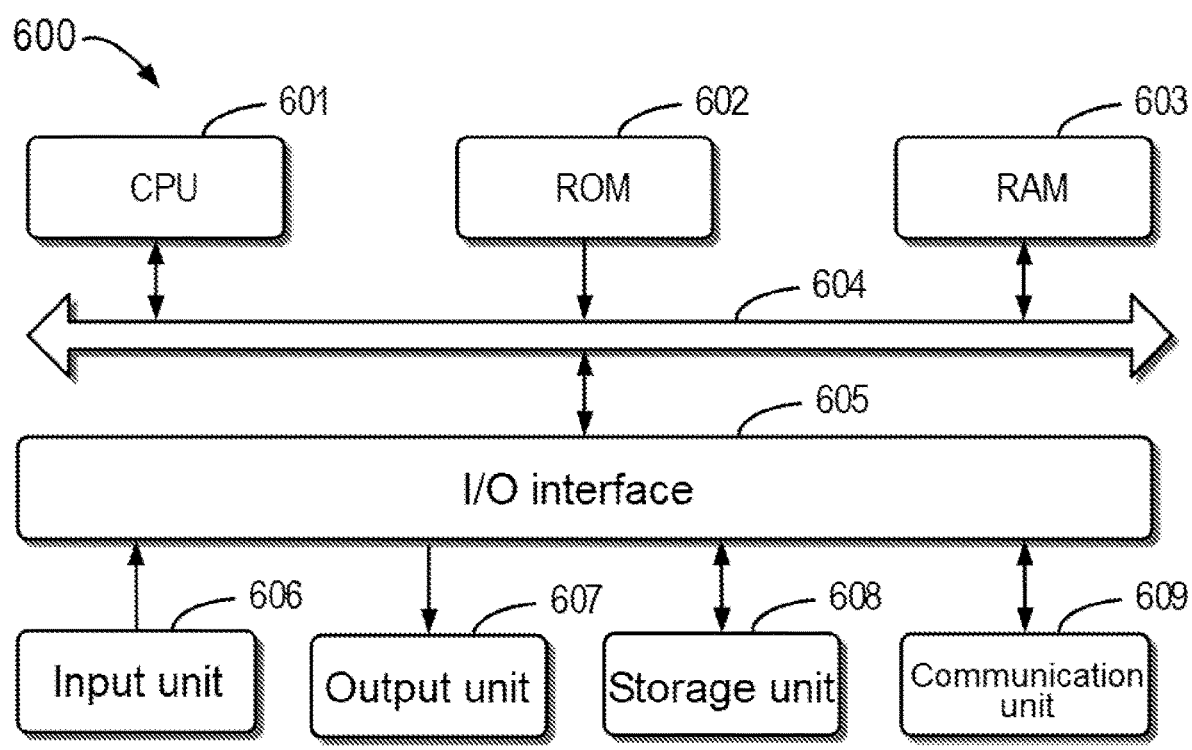
FIG. 6 illustrates a schematic block diagram of a device that may be used to implement embodiments of the present disclosure.

FIG. 6 is a schematic block diagram of a device 600 that may be used to implement embodiments of the present disclosure. The device 600 may be a device or an apparatus described in the embodiments of the present disclosure. As shown in FIG. 6, the device 600 includes a central processing unit (CPU) 601 that may perform various appropriate actions and processing according to computer program instructions stored in a read-only memory (ROM) 602 or computer program instructions loaded from a storage unit 608 to a random access memory (RAM) 603. Various programs and data required for the operation of the device 600 may also be stored in the RAM 603. The CPU 601, the ROM 602, and the RAM 603 are connected to each other through the bus 604. An input/output (I/O) interface 605 is also connected to the bus 604.

A plurality of components in the device 600 are connected to the I/O interface 605, including: an input unit 606, such as a keyboard and a mouse; an output unit 607, such as various types of displays and speakers; the storage unit 608, such as a magnetic disk and an optical disc; and a communication unit 609, such as a network card, a modem, and a wireless communication transceiver. The communication unit 609 allows the device 600 to exchange information/data with other devices via a computer network, such as the Internet, and/or various telecommunication networks.

The various methods or processes described above may be performed by the processing unit 601. For example, in some embodiments, the methods may be implemented as a computer software program that is tangibly included in a machine-readable medium such as the storage unit 608. In some embodiments, part of or all the computer program may be loaded and/or installed onto the device 600 via the ROM 602 and/or the communication unit 609. When the computer program is loaded onto the RAM 603 and executed by the CPU 601, one or more steps or actions of the methods or processes described above may be performed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in one or any combination of more programming languages, including object-oriented programming languages and conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions may be provided to a processing unit of a general-purpose computer, a special-purpose computer, or another programmable data processing apparatus to produce a machine, such that these instructions, when executed by the processing unit of the computer or another programmable data processing apparatus, generate an apparatus for implementing the functions/actions specified in one or more blocks in the flowcharts and/or block diagrams. The computer-readable program instructions may also be stored in a computer-readable storage medium. These instructions cause a computer, a programmable data processing apparatus, and/or another device to operate in a particular manner, such that the computer-readable medium storing the instructions includes an article of manufacture which includes instructions for implementing various aspects of the functions/actions specified in one or more blocks in the flowcharts and/or block diagrams.

The computer-readable program instructions may also be loaded onto a computer, other programmable data processing apparatuses, or other devices, so that a series of operating steps are performed on the computer, other programmable data processing apparatuses, or other devices to produce a computer-implemented process. Therefore, the instructions executed on the computer, other programmable data processing apparatuses, or other devices implement the functions/actions specified in one or more blocks in the flowcharts and/or block diagrams.

The flowcharts and block diagrams in the accompanying drawings show the architectures, functions, and operations of possible embodiments of the device, the method, and the computer program product according to a plurality of embodiments of the present disclosure. In this regard, each block in the flowcharts or block diagrams may represent a module, program segment, or part of an instruction, the module, program segment, or part of an instruction including one or more executable instructions for implementing specified logical functions. In some alternative embodiments, the functions denoted in the blocks may also occur in a sequence different from that shown in the figures. For example, two consecutive blocks may in fact be executed substantially concurrently, and sometimes they may also be executed in a reverse order, depending on the functions involved. It should be further noted that each block in the block diagrams and/or flowcharts as well as a combination of blocks in the block diagrams and/or flowcharts may be implemented by a dedicated hardware-based system executing specified functions or actions, or by a combination of dedicated hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or the technical improvements to technologies on the market, or to enable other persons of ordinary skill in the art to understand the embodiments disclosed here.

The invention claimed is:

1. A method for data anonymization, comprising:
performing classification on data that comprises a knowledge graph by a classifier to obtain data types of the data,
  wherein, upon receiving a request from a querying party, the data is obtained from a graphical database using a client device because the data matches a query criteria,
  wherein the data comprises company's sales data, customer data, and inventory data,
  wherein the customer data specifies a unique identifier of the customer, an address of the customer, and a phone number of the customer, and
  wherein the data types comprise a numeric data type, an enumerated data type, and a free text data type;
performing anonymization on the data by a first anonymization model of a plurality of anonymization models to obtain first anonymized data;
determining, based on the data types, using an anonymizer whether re-anonymization needs to be performed on the first anonymized data; and
performing, based on a determination that the re-anonymization needs to be performed, the re-anonymization on the first anonymized data by a second anonymization model of the plurality of anonymization models to obtain second anonymized data and to prevent a risk of the first anonymized data being leaked,
  wherein the re-anonymization needs to be performed because the first anonymization model is not suitable for processing the data.

2. The method according to claim 1, wherein performing the classification on the data using the classifier comprises at least one of:
performing the classification on the data using a regular expression;
performing the classification on the data using a dictionary base; or
performing the classification on the data using a machine learning model.

3. The method according to claim 1, wherein the data comprises tabular data, the tabular data comprising a plurality of data columns that have different ones of said data types.

4. The method according to claim 3, wherein performing the anonymization on the data by the first anonymization model comprises:
learning data patterns of the plurality of data columns by training a generative adversarial network model; and
performing the anonymization on the plurality of data columns separately using the trained generative adversarial network model, so as to generate the first anonymized data for each of the plurality of data columns.

5. The method according to claim 4, wherein determining using the anonymizer whether the re-anonymization needs to be performed on the first anonymized data comprises:
obtaining, through a data profile, a data anonymization level for each of the plurality of data columns;
obtaining, by the anonymizer, a query level for the querying party that queries the plurality of data columns; and
determining, based on the data types, the data anonymization level, and the query level, whether the re-anonymization needs to be performed on the first anonymized data of each of the plurality of data columns.

6. The method according to claim 5, wherein determining, based on the data types, the data anonymization level, and the query level, whether the re-anonymization needs to be performed on the first anonymized data of each of the plurality of data columns comprises:
determining that the re-anonymization does not need to be performed based on a determination that the data type of each of the plurality of data columns conforms to a data processing type of the first anonymization model; and
determining that the re-anonymization does not need to be performed based on a determination that the data anonymization level of each of the plurality of data columns is lower than the query level.

7. The method according to claim 6, wherein performing the re-anonymization by using the second anonymization model comprises:
obtaining a profile of the plurality of anonymization models, wherein the profile indicates each anonymization model of the plurality of anonymization models and the data processing type corresponding to said each anonymization model;
selecting, based on the profile and the data type, the second anonymization model from the plurality of anonymization models for the data type of each of the plurality of data columns; and
performing the re-anonymization on the first anonymized data of the plurality of data columns using the second anonymization model.

8. The method according to claim 6, wherein the plurality of anonymization models comprises at least two of:
a pseudo-data generation model;
a statistical model; or
a text generative adversarial network model.

9. An electronic device, comprising:
a processor; and
a memory coupled to the processor, wherein the memory has instructions stored therein which, when executed by the processor, cause the device to perform actions comprising:
  performing classification on data that comprises a knowledge graph by a classifier to obtain data types of the data,
    wherein, upon receiving a request from a querying party, the data is obtained from a graphical database using a client device because the data matches a query criteria,
    wherein the data comprises company's sales data, customer data, and inventory data,
    wherein the customer data specifies a unique identifier of the customer, an address of the customer, and a phone number of the customer, and
    wherein the data types comprise a numeric data type, an enumerated data type, and a free text data type;

performing anonymization on the data by a first anonymization model of a plurality of anonymization models to obtain first anonymized data;

determining, based on the data types, using an anonymizer whether re-anonymization needs to be performed on the first anonymized data; and performing, based on a determination that the re-anonymization needs to be performed, the re-anonymization on the first anonymized data by a second anonymization model of the plurality of anonymization models to obtain second anonymized data and to prevent a risk of the first anonymized data being leaked, wherein the re-anonymization needs to be performed because the first anonymization model is not suitable for processing the data.

10. The electronic device according to claim 9, wherein performing the classification on the data using the classifier comprises at least one of:

performing the classification on the data using a regular expression;

performing the classification on the data using a dictionary base; or performing the classification on the data using a machine learning model.

11. The electronic device according to claim 9, wherein the data comprises tabular data, the tabular data comprising a plurality of data columns that have different ones of said data types.

12. The electronic device according to claim 11, wherein performing the anonymization on the data by the first anonymization model comprises:

learning data patterns of the plurality of data columns by training a generative adversarial network model; and performing the anonymization on the plurality of data columns separately using the trained generative adversarial network model, so as to generate the first anonymized data for each of the plurality of data columns.

13. The electronic device according to claim 12, wherein determining using the anonymizer whether the re-anonymization needs to be performed on the first anonymized data comprises:

obtaining, through a data profile, a data anonymization level for each of the plurality of data columns;

obtaining, by the anonymizer, a query level for the querying party that queries the plurality of data columns; and determining, based on the data types, the data anonymization level, and the query level, whether the re-anonymization needs to be performed on the first anonymized data of each of the plurality of data columns.

14. The electronic device according to claim 13, wherein determining, based on the data types, the data anonymization level, and the query level, whether the re-anonymization needs to be performed on the first anonymized data of each of the plurality of data columns comprises:

determining that the re-anonymization does not need to be performed based on a determination that the data type of each of the plurality of data columns conforms to a data processing type of the first anonymization model; and determining that the re-anonymization does not need to be performed based on a determination that the data anonymization level of each of the plurality of data columns is lower than the query level.

15. The electronic device according to claim 14, wherein performing the re-anonymization by using the second anonymization model comprises:

obtaining a profile of the plurality of anonymization models, wherein the profile indicates each anonymization model of the plurality of anonymization models and the data processing type corresponding to said each anonymization model;

selecting, based on the profile and the data type, the second anonymization model from the plurality of anonymization models for the data type of each of the plurality of data columns; and performing the re-anonymization on the first anonymized data of the plurality of data columns using the second anonymization model.

16. The electronic device according to claim 14, wherein the plurality of anonymization models comprises at least two of:

a pseudo-data generation model;

a statistical model; or a text generative adversarial network model.

17. A computer program product that is tangibly stored on a non-volatile non-transitory computer-readable medium and comprises machine-executable instructions, wherein the machine-executable instructions, when executed, cause a machine to perform the following actions:

performing classification on data that comprises a knowledge graph by a classifier to obtain data types of the data, wherein, upon receiving a request from a querying party, the data is obtained from a graphical database using a client device because the data matches a query criteria, wherein the data comprises company's sales data, customer data, and inventory data, wherein the customer data specifies a unique identifier of the customer, an address of the customer, and a phone number of the customer, and wherein the data types comprise a numeric data type, an enumerated data type, and a free text data type;

performing anonymization on the data by a first anonymization model to obtain first anonymized data;

determining, based on the data types, using an anonymizer whether re-anonymization needs to be performed on the first anonymized data; and performing, based on a determination that the re-anonymization needs to be performed, the re-anonymization on the first anonymized data by a second anonymization model to obtain second anonymized data and to prevent a risk of the first anonymized data being leaked, wherein the re-anonymization needs to be performed because the first anonymization model is not suitable for processing the data.

18. The computer program product according to claim 17, wherein performing the classification on the data using the classifier comprises at least one of:

performing the classification on the data using a regular expression;

performing the classification on the data using a dictionary base; or performing the classification on the data using a machine learning model.

19. The computer program product according to claim 17, wherein the data comprises tabular data, the tabular data comprising a plurality of data columns that have different ones of said data types.

20. The computer program product according to claim 19, wherein performing the anonymization on the data by the first anonymization model comprises:
    learning data patterns of the plurality of data columns by training a generative adversarial network model; and
    performing the anonymization on the plurality of data columns separately using the trained generative adversarial network model, so as to generate the first anonymized data for each of the plurality of data columns.

* * * * *